United States Patent
Xie et al.

(10) Patent No.: US 12,489,268 B2
(45) Date of Patent: Dec. 2, 2025

(54) MID-INFRARED SEMICONDUCTOR SATURABLE ABSORBER MIRROR BASED ON INAS/GASB SUPERLATTICE AND PREPARATION METHOD THEREOF

(71) Applicants: Shanghai Jiao Tong University, Shanghai (CN); Shanghai Institute of Technical Physics, Chinese Academy of Sciences, Shanghai (CN)

(72) Inventors: Guoqiang Xie, Shanghai (CN); Zhipeng Qin, Shanghai (CN); Yi Zhou, Shanghai (CN); Jianxin Chen, Shanghai (CN)

(73) Assignees: Shanghai Jiao Tong University, Shanghai (CN); Shanghai Institute of Technical Physics, Chinese Academy of Sciences, Shanghai (CN)

( * ) Notice: Subject to any disclaimer, the term of this patent is extended or adjusted under 35 U.S.C. 154(b) by 585 days.

(21) Appl. No.: 18/059,935

(22) Filed: Nov. 29, 2022

(65) Prior Publication Data

US 2023/0105777 A1   Apr. 6, 2023

Related U.S. Application Data

(63) Continuation of application No. PCT/CN2021/114656, filed on Aug. 26, 2021.

(30) Foreign Application Priority Data

Jan. 4, 2021 (CN) .......................... 202110003179.6

(51) Int. Cl.
*H01S 3/1118* (2023.01)
*H01S 3/04* (2006.01)
*H01S 3/08* (2023.01)

(52) U.S. Cl.
CPC .......... *H01S 3/1118* (2013.01); *H01S 3/0405* (2013.01); *H01S 3/08059* (2013.01)

(58) Field of Classification Search
CPC ... H01S 3/1118; H01S 3/0405; H01S 3/08059
See application file for complete search history.

(56) References Cited

U.S. PATENT DOCUMENTS

| 5,898,720 A | * | 4/1999 | Yamamoto | ............. | B82Y 20/00 372/39 |
| 2007/0076770 A1 | | 4/2007 | Galun et al. | | |

(Continued)

FOREIGN PATENT DOCUMENTS

CN        105742956 A       7/2016

OTHER PUBLICATIONS

JP H1114810 A machine translation (Year: 1999).*

*Primary Examiner* — James A Dudek
(74) *Attorney, Agent, or Firm* — Mei & Mark LLP; Manni Li (57) ABSTRACT

A mid-infrared semiconductor saturable absorber mirror based on InAs/GaSb superlattice comprises a GaSb substrate with an anti-reflection film coated on the lower surface of the GaSb substrate; InAs/GaSb superlattice which has a specific structure and thickness and is arranged on the GaSb substrate; and Bragg reflection film which is arranged on the InAs/GaSb superlattice, wherein Bragg reflection film is composed of multiple pairs of ZnS and $YbF_3$ film layers with a thickness of ¼ wavelength, and the $YbF_3$ film layer is connected with the InAs/GaSb superlattice. The device not only has a mid-infrared working range with a broadband operation bandwidth, but also has the advantages of designable parameters, outstanding robustness, high damage threshold and the like, and sets a foundation for the development of mid-infrared ultrafast mode-locked lasers.

6 Claims, 6 Drawing Sheets

(56) References Cited

U.S. PATENT DOCUMENTS

2012/0205352 A1  8/2012  Fermann
2018/0212080 A1  7/2018  Meyer et al.

* cited by examiner

MID-INFRARED SEMICONDUCTOR SATURABLE ABSORBER MIRROR BASED ON INAS/GASB SUPERLATTICE AND PREPARATION METHOD THEREOF

CROSS-REFERENCE TO RELATED APPLICATIONS

The subject application is a continuation of PCT/CN2021/114656 filed on Aug. 26, 2021, which claims priority on Chinese Application No. 202110003179.6 filed on Jan. 4, 2021 in China. The contents and subject matter of the PCT international application and Chinese priority application are incorporated herein by reference.

TECHNICAL FIELD

The present invention relates to the technical field of laser, and particularly a mid-infrared (mid-IR) semiconductor saturable absorber mirror (SESAM) based on the InAs/GaSb superlattice and preparation method thereof.

BACKGROUND ART

SESAM is a core device for developing ultrafast mode-locked laser. It is usually used as a cavity mirror to initiate and retain the stable mode-locking operation. Because of the advantages of the flexibly designable parameters, outstanding robustness, and easy integration, SESAM has become a predominant passive mode-locking device for ultrafast laser.

Traditional SESAMs mainly adopt an $In_xGa_{1-x}As$ quantum well as the saturable absorber layer, of which the quantized energy level is manipulated by the proportion of indium (In) in a $In_xGa_{1-x}As$ potential well. The bandgap of a $In_xGa_{1-x}As$ quantum well is reduced with the increase of the proportion of In. However, even when the proportion of In reaches to 100%, there is still an bandgap of 0.36 eV, corresponding to the light absorption cutoff wavelength of 3.4 μm. In fact, when the proportion of In is close to 100%, the lattice mismatch between the potential well layer $In_xGa_{1-x}As$ and the potential barrier layer GaAs may become very serious, which leads to the sharp decrease in the damage threshold of the saturable absorber mirror. Therefore, the working wavelength of the traditional $In_xGa_{1-x}As$-quantum-well-based SESAM is limited to below 3 μm.

Mid-IR spectral range of 3-20 μm includes the vibration and rotation characteristic absorption spectra of many gases and organic molecules; and at the same time, this spectral range covers two transmission windows of atmosphere. Therefore, mid-IR ultrafast lasers in the 3-20 μm region are of great importance for applications such as the gas spectroscopy, medical diagnosis, remote sensing, free-space communication, etc. In the past decade, mid-IR continuous-wave fiber lasers beyond 3 μm have attracted widespread attention with the rapid development of fluoride and chalcogenide gain fibers. However, the development of the ultrafast mode-locked lasers beyond 3 μm been impeded by the lack of a robust saturable absorber. Therefore, it is urgent to develop a mid-IR SESAM beyond 3 μm.

SUMMARY OF THE INVENTION

In order to overcome the disadvantages of the existing technology, the present invention provides an InAs/GaSb-superlattice-based SESAM and its preparation method. The InAs/GaSb superlattice is an artificial periodic structure created by alternately growing InAs and GaSb with a thickness of several atomic layers. Its designable small bandgap allows InAs/GaSb superlattice to operate in the mid-IR region. Due to the small thickness of InAs and GaSb layers, an electron (hole) wave function between potential wells (potential barriers) can be coupled with each other, which widens an electron energy (hole energy) level of the superlattice so that an ultrawide working bandwidth can be obtained. The InAs/GaSb superlattice and the GaSb substrate have no lattice mismatch problem, and the small lattice mismatch in InAs/GaSb superlattice can be reduced by further introducing an InSb interface, which is conducive to increasing a damage threshold of the SESAM. In order to prepare the mid-IR SESAM, it is necessary to strictly control the nanostructure and thickness of the superlattice to satisfy the working condition of the saturable absorber mirror. Furthermore, the InAs/GaSb superlattice and the GaSb substrate are respectively coated with Bragg reflection film and anti-reflection film. By designing the appropriate Bragg reflection film, the InAs/GaSb superlattice can be located at a wave peak of a standing wave light field so that the saturation energy fluence is reduced. By coating an anti-reflection film, all the light passes through the InAs/GaSb superlattice so that the saturation energy fluence is further reduced and an F-P cavity effect of the saturable absorber mirror is eliminated to realize a broad working bandwidth. Besides, Bragg reflection film is directly coated on the surface of the superlattice through vacuum ion beam sputtering so that the lattice match with the superlattice is not required. The InAs/GaSb-superlattice-based SESAM not only possesses the advantages (design flexibility, long-term stability, easy integration, etc.) of a near-infrared SESAM, but also can extend the working wavelength beyond 3 μm with an ultrawide working bandwidth.

The technical solutions of the present invention are as follows:

The present invention provides a mid-IR SESAM based on InAs/GaSb superlattice, comprising a GaSb substrate having a lower surface, the GaSb substrate being coated with an anti-reflection film on the lower surface; an InAs/GaSb superlattice arranged on the GaSb substrate; Bragg reflection film arranged on the InAs/GaSb superlattice and having an upper surface; wherein Bragg reflection film is composed of multiple pairs of ZnS and $YbF_3$ film layers, and the $YbF_3$ film layer is connected with the InAs/GaSb superlattice.

In the mid-IR SESAM based on the InAs/GaSb superlattice of the present invention, the upper surface of Bragg reflection film may be bonded with a heat sink.

In the mid-IR SESAM based on the InAs/GaSb superlattice of the present invention, the InAs/GaSb superlattice may comprise a GaSb layer and an InAs layer growing alternately; an InSb layer may be contained between the GaSb layer and the InAs layer to adjust material lattice mismatch; the InAs/GaSb superlattice may have 20-100 periods; the thickness of InAs and GaSb in each period may be 5-30 atomic layers; and a specific thickness may be determined according to a laser wavelength and a material absorption coefficient of the superlattice.

In the mid-IR SESAM based on the InAs/GaSb superlattice of the present invention, the InAs/GaSb superlattice may be located at a wave peak position of a standing wave light field.

In the mid-IR SESAM based on the InAs/GaSb superlattice of the present invention, Bragg reflection film may be formed by stacking periodic $YbF_3$/ZnS films, and a thickness of the $YbF_3$ or ZnS film may be a quarter of a laser wavelength.

The present invention further provides a method for preparing the mid-IR SESAM based on the InAs/GaSb superlattice, comprising (1) polishing a GaSb semiconductor baseplate to obtain a GaSb substrate; (2) alternately growing an InAs layer, an InSb transitional layer and a GaSb layer with a short-period structure on the GaSb substrate by a molecular beam epitaxy technology to form the InAs/GaSb superlattice; (3) coating a surface of the InAs/GaSb superlattice and a surface of the substrate respectively with Bragg reflection film and an anti-reflection film by using a vacuum ion beam sputtering technology; and (4) pasting a prepared sample on metal heat sink with high heat conductivity through heat conducting adhesive to prepare the mid-IR SESAM.

Bragg reflection film has high reflectivity for incident laser and is formed by alternately growing multiple pairs of high-refractive-index materials and low-refractive-index materials with a thickness of ¼ wavelength, wherein the high-refractive-index material is ZnS, and the low-refractive-index material is $YbF_3$; and the materials are deposited on the surface of the InAs/GaSb superlattice by vacuum ion beam sputtering.

In the present invention, the heat sink is metal with high heat conductivity, such as copper.

The present invention further provides a preparation method for the mid-IR SESAM based on the InAs/GaSb superlattice, which comprises the following steps:

firstly, polishing a GaSb semiconductor baseplate to obtain a GaSb substrate;

secondly, alternately growing an InAs nanolayer, an InSb transitional layer and a GaSb nanolayer with a short-period structure on the Gasb substrate by a molecular beam epitaxy technology to form the InAs/GaSb superlattice with low lattice mismatch;

thirdly, coating a surface of the InAs/GaSb superlattice and a surface of the substrate respectively with Bragg reflection film and an anti-reflection film by using a vacuum ion beam sputtering technology; and fourthly, pasting a prepared sample on metal heat sink with high heat conductivity through heat conducting adhesive to prepare the mid-IR SESAM.

In the present invention, the InAs/GaSb superlattice is formed by multiple layers of InAs and GaSb nanolayers that is grown alternately and is used as a saturable absorber layer; a wave function of adjacent potential wells (potential barriers) of the InAs/GaSb superlattice is coupled to widen an electron quantized level (hole quantized level), thereby having an ultrawide working wavelength range. The InAs/GaSb superlattice is formed by a molecular beam epitaxy method.

In the present invention, the substrate is semiconductor GaSb, the InAs/GaSb superlattice grows on the surface of the substrate, and good lattice match between the substrate and the superlattice is realized by adopting an InSb transitional layer.

In the present invention, the anti-reflection film has high transmittance for the incident laser and is prepared by adopting a vacuum ion beam sputtering.

Compared with the existing technology, the present invention has the following beneficial effects:

(1) The mid-IR SESAM based on the InAs/GaSb superlattice has a longer working wavelength, and can satisfy the mode-locking requirement of lasers beyond 3 μm. It also possesses the excellent characteristics of near-infrared SESAMs (designable parameters, outstanding robustness, high damage threshold, etc.) and will promote the development of mid-IR ultrafast coherent sources and related application fields.

(2) The electron quantized level (hole quantized level) of the InAs/GaSb superlattice is widened due to the strong coupling effect of the adjacent potential wells (potential barriers), so that the superlattice has wide working bandwidth.

(3) Bragg reflection film is directly coated on the surface of the superlattice through the vacuum ion beam sputtering, so that the lattice match with the superlattice is not required. Moreover, the complicated molecular beam epitaxy method is not needed for preparation, so that compared with the traditional method, the preparation difficulty is greatly reduced.

DETAILED DESCRIPTION OF THE INVENTION

The present invention is further described below in conjunction with the drawings and embodiments, but the protection scope of the present invention shall not be limited thereby.

Figure 1:
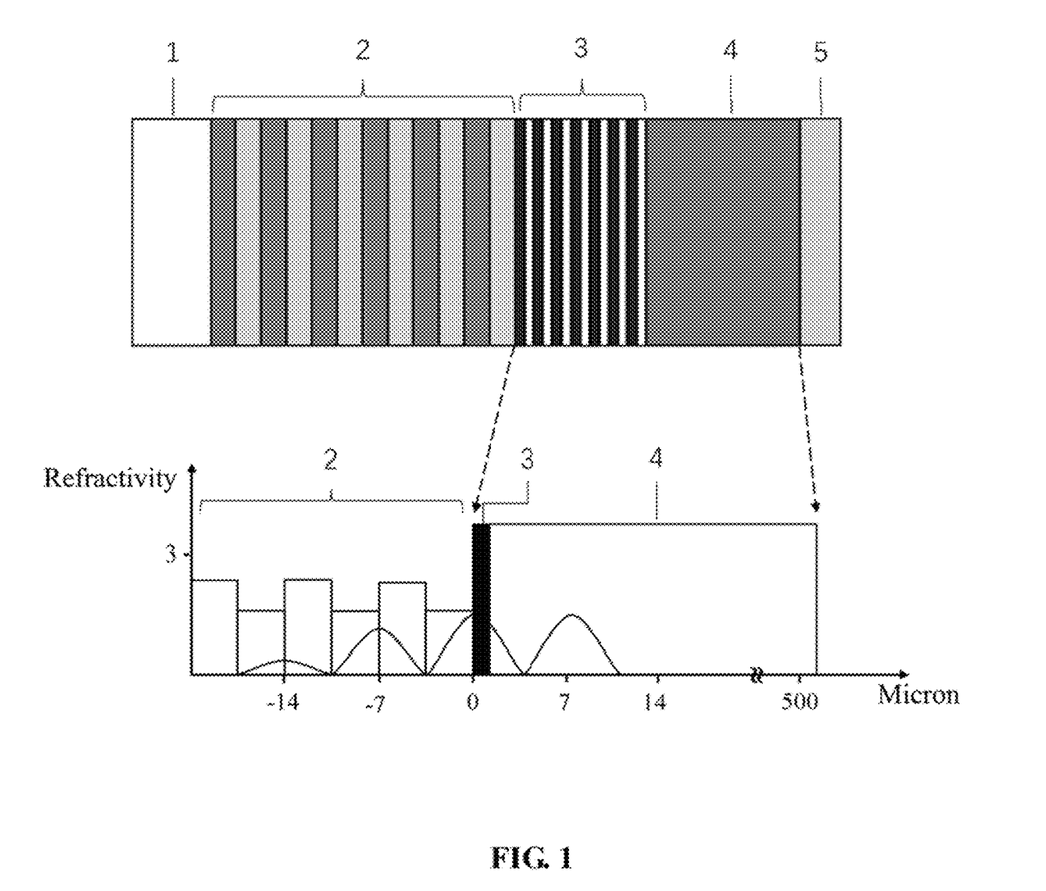
FIG. 1 shows the structure schematic of the mid-IR SESAM based on InAs/GaSb superlattice and the standing-wave intensity pattern of an incident light field.

As shown in FIG. 1, mid-IR SESAM based on InAs/GaSb superlattice successively comprises heat sink 1, Bragg reflection film 2, InAs/GaSb superlattice 3, GaSb substrate 4 and anti-reflection film 5 from left to right.

Firstly, the InAs/GaSb superlattice 3 grows on the substrate 4. The substrate 4 is semiconductor GaSb with a thickness of 500 μm; and the left surface and right surface of the substrate 4 have been polished to deposit the anti-reflection film 5 and to grow the InAs/GaSb superlattice 3, respectively. The InAs/GaSb superlattice 3 is formed by alternately growing InAs (8 atomic layers) and GaSb (8 atomic layers) films by using a molecular beam epitaxy method; and a single atomic layer of InSb grows between the InAs film and the GaSb film as a transitional layer. The InAs/GaSb superlattice 3 contains 50 periods of InAs/GaSb with a total thickness about 250 nm. Numerical calculation shows that a bandgap of the InAs/GaSb superlattice is 0.244 eV, and the longest working wavelength is greater than 5 μm.

Secondly, the right surface of the substrate 4 is coated with the anti-reflection film 5, thereby reducing the saturation energy fluence; the surface of the InAs/GaSb superlattice 3 is coated with Bragg reflection film 2; the Bragg reflection film 2 is formed by stacking 20 periods of $YbF_3$/ZnS films; a thickness of the $YbF_3$ or ZnS film is a quarter of a laser central wavelength; and the closer film to superlattice is the $YbF_3$ film, as shown in FIG. 1.

Finally, a prepared sample is pasted to the surface of the heat sink of a copper plate through high heat conductivity adhesive.

Figure 2:
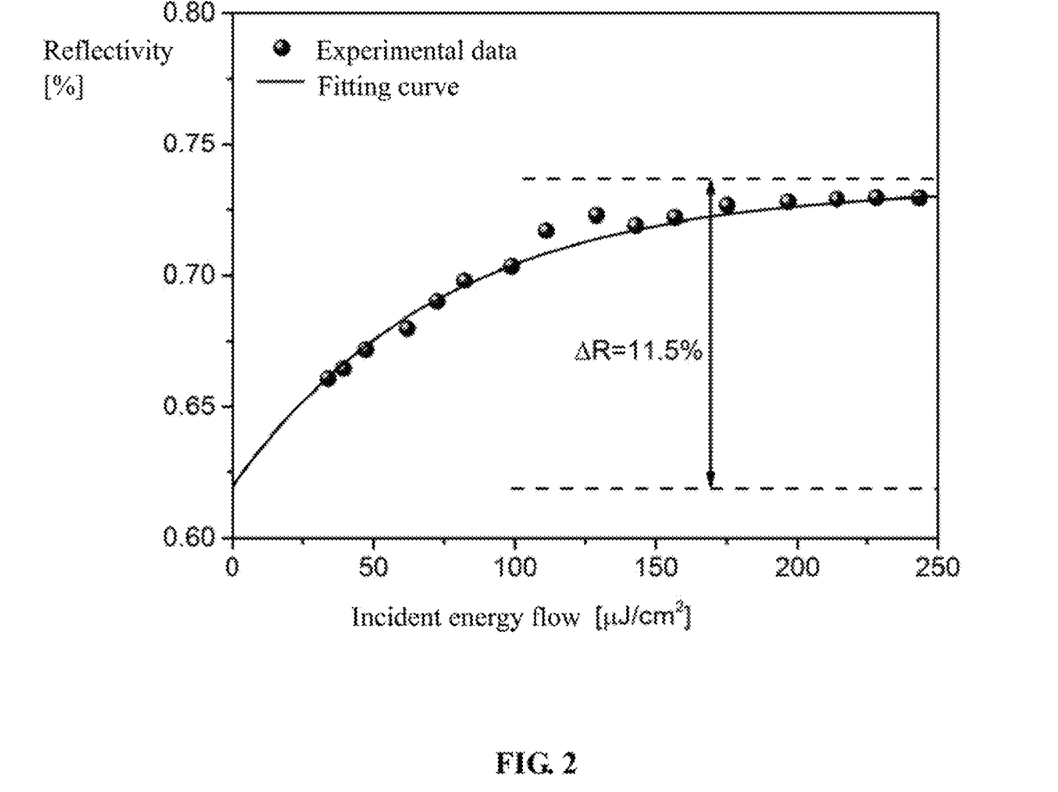
FIG. 2 shows the measured dependence of the reflectivity on incident pulse fluence at 3.5 μm for mid-IR SESAM.

The saturable absorption characteristics of the mid-IR SESAM based on the InAs/GaSb superlattice is proved by a Z-scan measurement, with a modulation depth of 11.5% and a saturation energy fluence of 74 µJ/cm² at 3.5 µm, as shown in FIG. 2.

Figure 3:
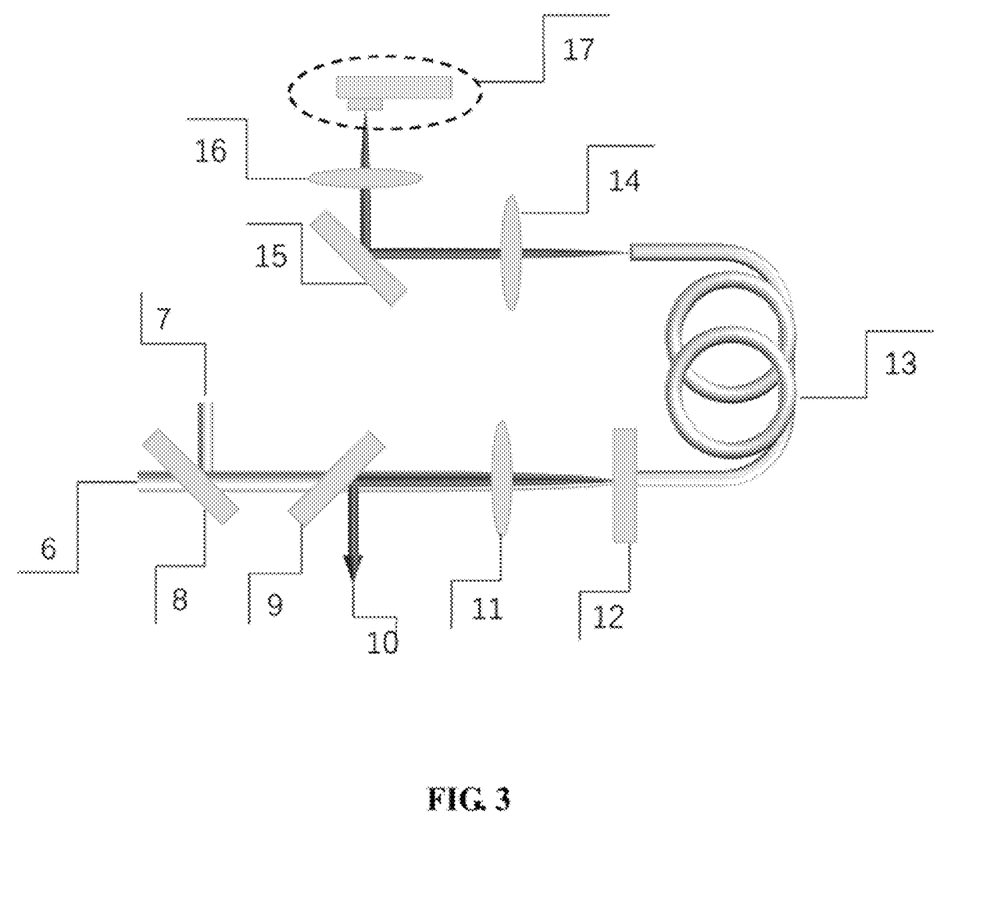
FIG. 3 shows the experimental setup schematic of 3.5 μm mode-locked fluoride fiber laser established with the present invention.

FIG. 3 illustrates an experimental demonstration of the present invention in a 3.5 µm mode-locked fluoride fiber laser. It may be seen from FIG. 3 that pumping light 6 and 7 is combined by a beam combiner 8 and successively passes through a trichromatic mirror 9, a lens 11 and an output coupler 12 to enter a fluoride fiber 13. A laser resonant cavity is composed of the output coupler 12, the fluoride fiber 13, a lens 14, a trichromatic mirror 15, a lens 16 and a mid-IR SESAM 17. The output laser is reflected by the trichromatic mirror 9 and then separated from the pumping light 6 and 7.

Figure 4:
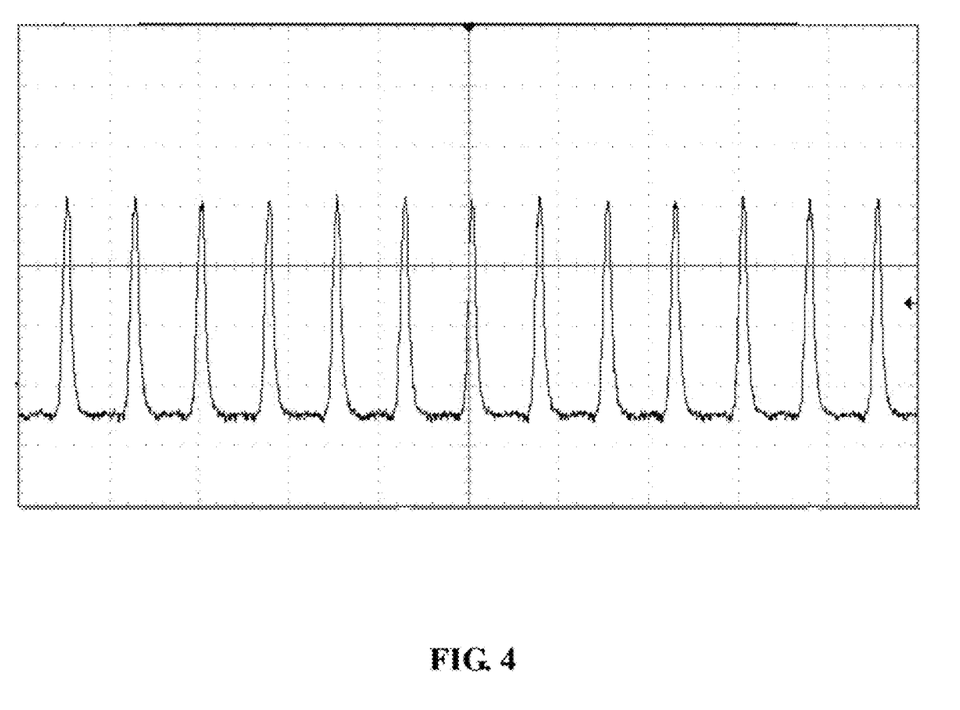
FIG. 4 shows the pulse train from the 3.5 μm mode-locked fluoride fiber laser established with the present invention.
Figure 5:
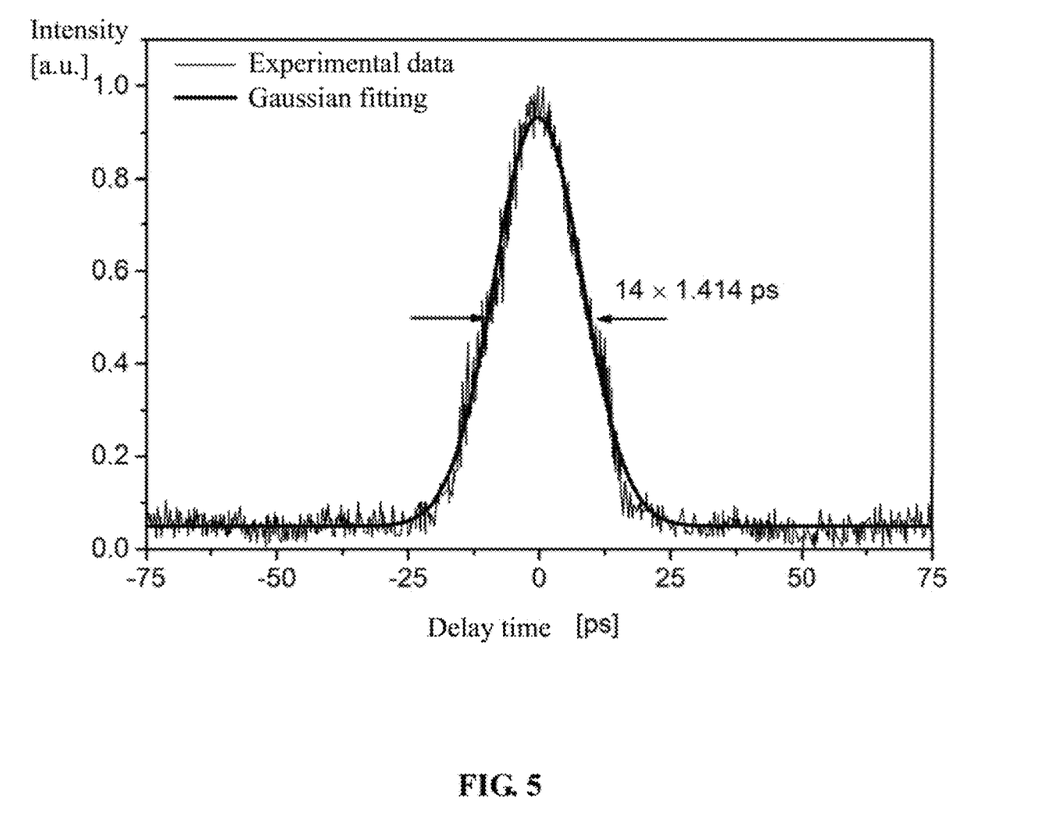
FIG. 5 shows the autocorrelation curve of the output pulse from the 3.5 μm mode-locked fluoride fiber laser established with the present invention.
Figure 6:
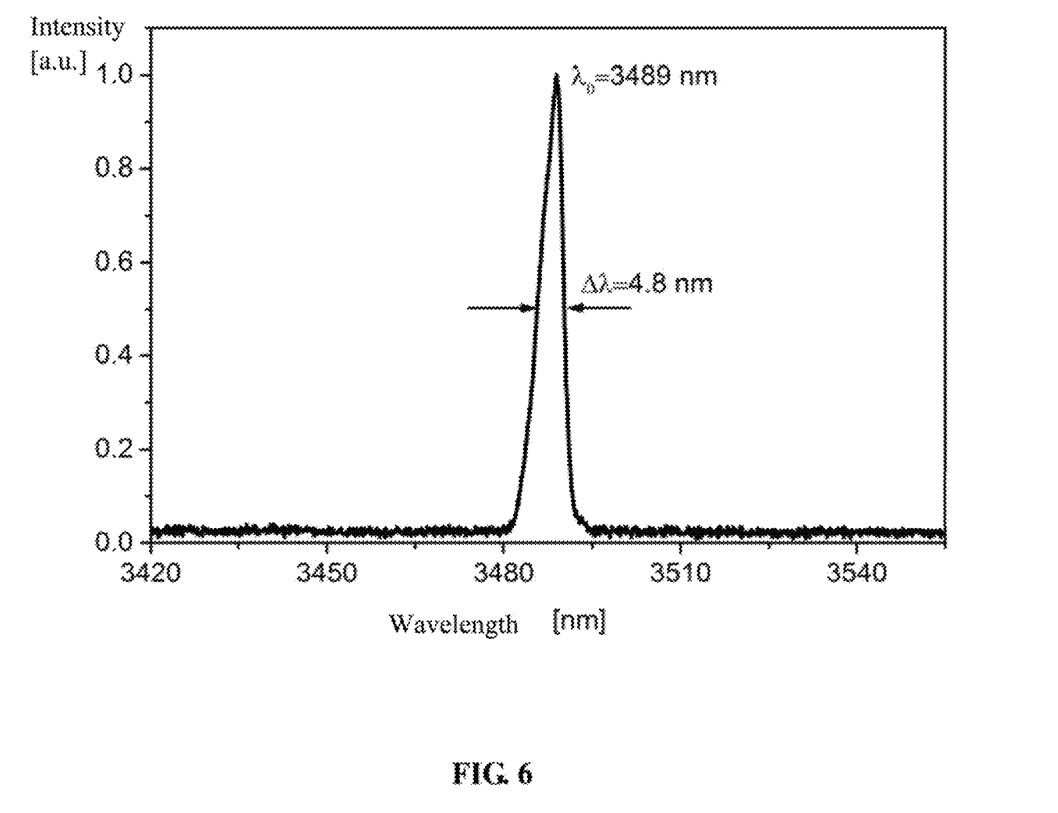
FIG. 6 shows the spectrum of the output pulse from the 3.5 μm mode-locked fluoride fiber laser established with the present invention.

The mid-IR SESAM 17 based on the InAs/GaSb superlattice is a core element of the 3.5 µm mode-locked fluoride fiber laser. On the one hand, the mid-IR SESAM is used as an end mirror of the laser to form an entire mode-locked cavity, as shown in FIG. 3; on the other hand, the mid-IR SESAM is used as a mode-locked element to start and maintain the mode-locking operation. FIG. 4 is a mode-locked pulse train delivered from the laser with a pulse interval of 30 ns, corresponding to a repetition rate of 33.24 MHz. FIG. 5 shows an autocorrelation trace of the mode-locked pulse with a pulse width of 14 ps. FIG. 6 shows a spectrum of the mode-locked pulse at a central wavelength of 3489 nm.

Experimental results show that the present invention may realize the stable mode locking of the 3.5 µm fluoride fiber laser. When the output power is 64 mW, the energy fluence on the mid-IR SESAM is about 6 mJ/cm², which is greater than a damage threshold (~2 mJ/cm²) of the conventional near-infrared SESAM. The high damage threshold can be attributed to the good lattice match of the InAs/GaSb superlattice. Generally, the mid-IR SESAM based on the InAs/GaSb superlattice not only extends the working wavelength range of the SESAM, but also has high damage threshold and ultrawide working bandwidth, thereby paving a way for the development of the mid-IR ultrafast mode-locked laser.

The embodiment is only used to illustrate the technical solution of the present invention, but not to limit the present invention. Modifications or equivalent substitutions made by those ordinary skilled in the art should be included in the claim scope of the present invention without deviating from the spirit and scope of the technical solution of the present invention.

We claim:
1. An InAs/GaSb superlattice-based mid-infrared semiconductor saturable absorber mirror, comprising:
a GaSb substrate having a lower surface, the GaSb substrate being coated with an anti-reflection film on the lower surface;
an InAs/GaSb superlattice arranged on the GaSb substrate;
Bragg reflection film arranged on the InAs/GaSb superlattice and having an upper surface;
wherein Bragg reflection film is composed of multiple pairs of ZnS and YbF₃ film layers, and the YbF₃ film layer is connected with the InAs/GaSb superlattice.
2. The InAs/GaSb superlattice-based mid-infrared semiconductor saturable absorber mirror according to claim 1, wherein the upper surface of Bragg reflection film is bonded with a heat sink.
3. The InAs/GaSb superlattice-based mid-infrared semiconductor saturable absorber mirror according to claim 1, wherein the InAs/GaSb superlattice comprises a GaSb layer and an InAs layer growing alternately;
an InSb transitional layer is contained between the GaSb layer and the InAs layer to reduce the lattice mismatch;
the InAs/GaSb superlattice has 20-100 periods;
the thickness of InAs and GaSb in each period is 5-30 atomic layers to cover the mid-IR spectral region; and
a specific thickness is determined according to a laser wavelength and a material absorption coefficient of the superlattice.
4. The InAs/GaSb superlattice-based mid-infrared semiconductor saturable absorber mirror according to claim 1, wherein the InAs/GaSb superlattice is located at a wave peak position of a standing wave light field.
5. The InAs/GaSb superlattice-based mid-infrared semiconductor saturable absorber mirror according to claim 1, wherein Bragg reflection film is formed by stacking periodic YbF₃/ZnS films, and a thickness of the YbF₃ or ZnS film is a quarter of a laser center wavelength.
6. A method for preparing the InAs/GaSb superlattice-based mid-infrared semiconductor saturable absorber mirror of claim 1, comprising:
(1) polishing a GaSb semiconductor baseplate to obtain a GaSb substrate;
(2) alternately growing an InAs nanolayer, an InSb transitional layer and a GaSb nanolayer with a short-period structure on the Gasb substrate by adopting a molecular beam epitaxy technology to form the InAs/GaSb superlattice;
(3) coating a surface of the InAs/GaSb and a surface of the substrate respectively with Bragg reflection film and an anti-reflection film by using a vacuum ion beam sputtering technology; and
(4) pasting a prepared sample on metal heat sink with high heat conductivity through heat conducting adhesive to prepare the mid-IR SESAM.

* * * * *